Figure 1:
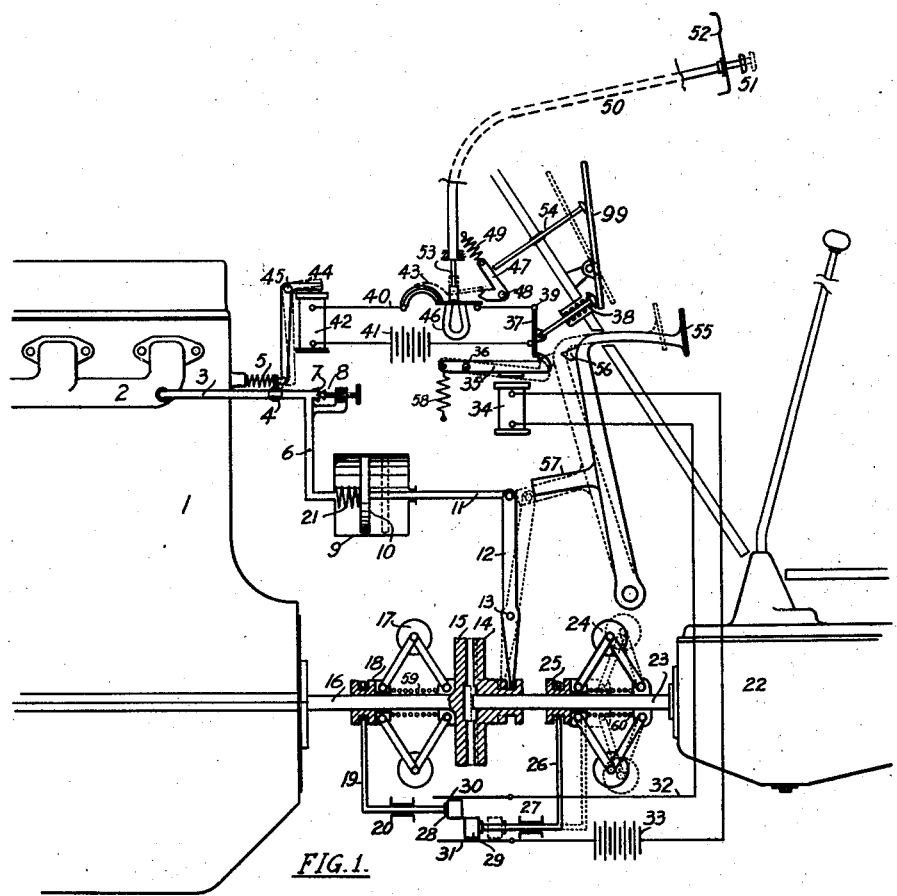

Oct. 10, 1939.    M. CASERTA    2,175,179
MOTOR CAR CONTROLLING MEANS
Filed Feb. 8, 1932    3 Sheets-Sheet 1

Michele Caserta
INVENTOR.

Oct. 10, 1939.  M. CASERTA  2,175,179
MOTOR CAR CONTROLLING MEANS
Filed Feb. 8, 1932   3 Sheets-Sheet 2

Michele Caserta
INVENTOR.

*Michele Caserta*
INVENTOR.

Patented Oct. 10, 1939

2,175,179

UNITED STATES PATENT OFFICE 2,175,179

MOTOR-CAR CONTROLLING MEANS

Michele Caserta, Detroit, Mich., assignor to Bendix Aviation Corporation, South Bend, Ind., a corporation of Delaware Application February 8, 1932, Serial No. 591,523

3 Claims. (Cl. 192—.01)

This invention relates to improvements in motor-car controlling means, and more especially to a new and novel construction thereof tending to simplify, render more efficient and improve the same generally.

Prior art structures provide means which automatically throw the clutch out of engagement every time the accelerator pedal is released; the transmission gears can then be shifted without operating the clutch pedal and the car can coast or free-wheel.

Some prior art structures also provide a manual selector or control, by which the driver may at will discontinue the activity of the automatic clutch means and let the engine act as a brake whenever the accelerator pedal is released. However, when said activity is so discontinued it becomes necessary for the driver to operate the clutch pedal directly, before shifting gears; and as more frequent gear shifting is required in hilly country right when it is safer to avoid free-wheeling, the driver accustomed to the automatic clutch finds even more objectionable the necessity of operating the clutch pedal directly.

Furthermore, with such structures if it is desired to accelerate the idling engine while the car is coasting at high speed, as soon as the accelerator pedal is depressed the clutch is immediately engaged while the speed of the driving member is by far below the speed of the driven member; this results in a jerk which imposes undue strain on motor and transmission and great discomfort to the passengers.

To avoid these objections I provide means by which the free-wheeling activity of the automatic clutch may be discontinued at will of the driver, still retaining the advantages of the automatic clutch only when shifting gears; said means also retard the re-engagement of the clutch until the engine speed corresponds to the speed of the vehicle.

These and other objects of the invention, as well as novel details of construction, will be more apparent as the description proceeds.

For the purpose of setting forth a clear description and understanding of my invention, I have shown the preferred general arrangement thereof in connection with a motor car or automotive vehicle provided with the usual motor, clutch, transmission and controls, without any intention however to limit the scope of the invention to this embodiment. Many details pertaining to the combination of said car parts and accessories being already known in the art have been represented in a diagrammatical form, while a full disclosure has been made of the new means and arrangements forming the particular subject matter of the invention.

Figure 2:
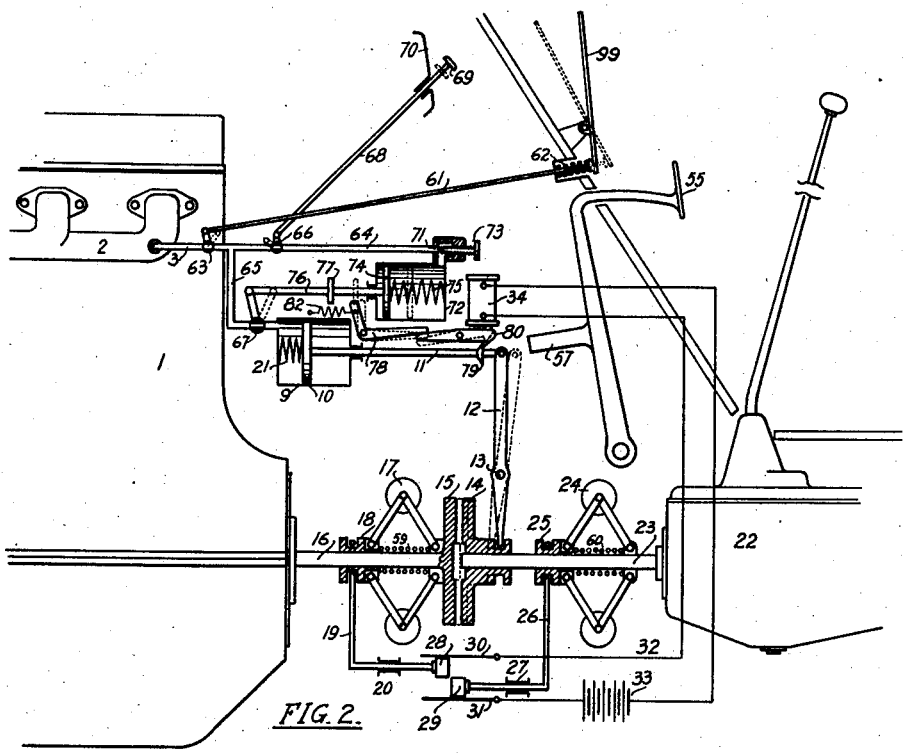
Figure 3:
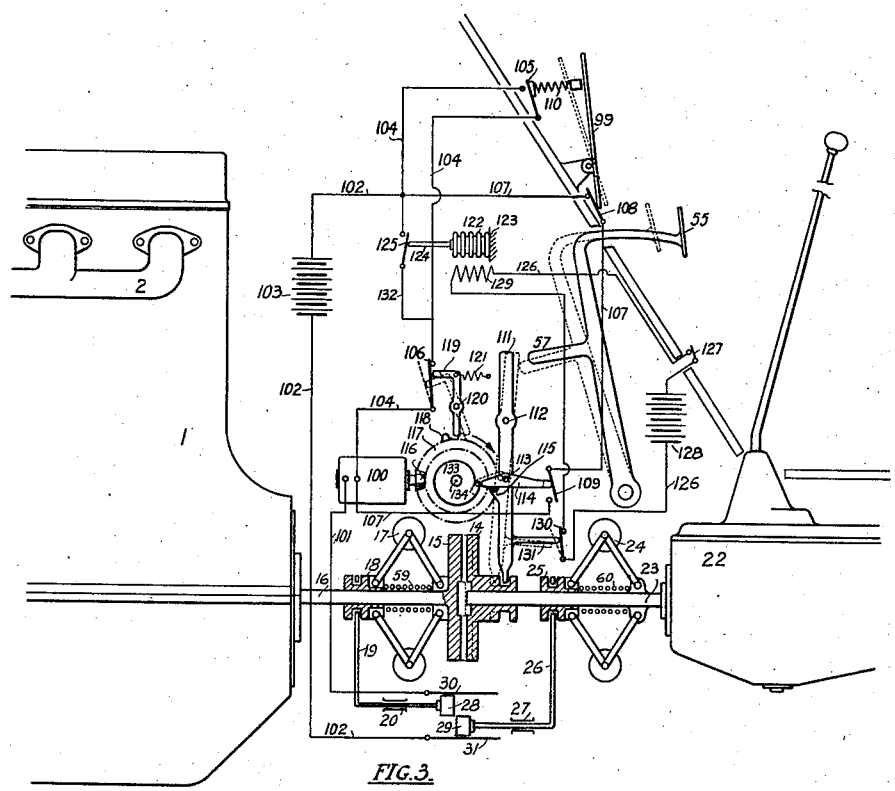
Figure 4:
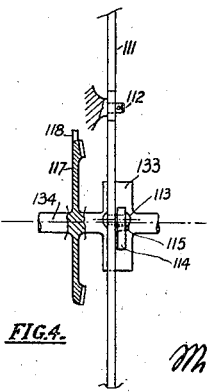

In the accompanying drawings:

Figures 1, 2 and 3 are views showing the general arrangement of three different embodiments of controlling means constructed in accordance with my invention, the structures being illustrated semi-diagrammatically for the purpose of clearness, and Figure 4 is a fragmentary view showing in larger scale some of the parts of the structure shown in Figure 3.

Referring now more particularly to Figure 1, it will be noted that the reference character 1 indicates the engine or motor, 2 indicates the intake manifold of said engine, 3 a pipe (or similar means providing a port) connected to said manifold, 4 a valve in said pipe and 5 a spring which tends to keep said valve in the closed position; 6 is a pipe connected to valve 4, and 7 is an opening or orifice setting communication between said pipe 6 and the atmosphere, while 8 is a needle valve for regulating said opening. Numeral 99 designates the accelerator pedal.

Numeral 9 is a vacuum cylinder herein called clutch cylinder, 10 a piston in said cylinder, 11 a piston rod connecting said piston to a lever 12 which can pivot around point 13 and so control the position of the driven member of the clutch 14.

Numeral 15 indicates the driving member of the clutch which is solid with the engine shaft 16; 17 is a centrifugal device of the sort known in the art, which through sliding collar 18 regulates the position of the sliding member 19 mounted in bearing 20; the reference character 59 indicates a return spring.

Spring 21 has a tendency to push piston 10 to the bottom of cylinder 9 and so keep the clutch engaged. The car transmission is indicated by numeral 22, while 23 is the transmission shaft, 24 another centrifugal device which through sliding collar 25 controls the position of sliding member 26 mounted in bearing 27, and 60 is a return spring.

Two brushes or conductors 28 and 29 are mounted in an insulated manner on members 19 and 26 respectively and may or may not be in contact with each other according to the position of said sliding members, but are always in contact with, and slide on, the two bars or conductors 30 and 31 respectively; said bars are inserted in circuit 32 which includes a source of electric current 33 and a solenoid or electromagnet 34. When current circulates in it, said magnet 34 attracts ratchet or pawl 35 which rotates around point 36 against tension of spring 58 and releases switch or bar 37; said switch in turn rotates, under tension of spring 38, around point 39 and opens circuit 40, which includes a source of electric current 41, a solenoid 42 and a thermostatic switch 43.

When circuit 40 is closed, solenoid 42 attracts armature or angle lever 44 which rotates clockwise around point 45 and compels valve 4 to rotate in anti-clockwise direction against tension of spring 5 and open port 3. The thermostatic switch 43 opens automatically, as already known in the art, after current has been flowing in circuit 40 for a predetermined time and the thermostatic element (which in Figure 1 is represented as being of the bimetallic construction) has attained a predetermined temperature.

Before said temperature is attained, the tension of the thermostatic element is insufficient to detach switch blade 43 from permanent magnet 46, which holds the switch closed; but when the proper temperature is attained switch 43 snaps away from the magnet into the position shown by dotted lines, where it is kept thereafter by ratchet or catch 47. Said catch 47 may oscillate around point 48 but is usually kept in the position shown, by tension of spring 49.

A Bowden wire 50 connects a control button 51, preferably mounted on instrument panel 52, to a plunger 53 which closes switch 43 when button 51 is pressed. Another plunger 54, preferably operated by the accelerator pedal, when pressed makes ratchet 47 rotate around point 48 and get out of the way of switch 43.

The clutch pedal 55 carries two extensions, 56 and 57, which engage catch 35 and lever 12 respectively when said clutch pedal is depressed.

In Figure 2 is shown a different arrangement embodying the principles of the present invention. Accelerator pedal 99 operates valve 63 through rod 61, which is kept under tension by spring 62. Pipe 3, connected to the intake manifold, branches into two pipes, 64 and 65, controlled by valves 66 and 67 respectively. Valve 66 is operated from instrument panel 70 by means of a control rod 68 and button 69.

Numeral 71 indicates an opening or orifice setting communication between pipe 64 and cylinder 72 herein called secondary cylinder, while 73 indicates a regulating needle or screw for varying the aperture of said orifice. Spring 75, acting on piston 74 and piston rod 76, tends to keep valve 67 in the open position; piston rod 76 is provided with a stop or disc 77 which, when moved to the right, engages angle lever 78 against tension of spring 82.

A stop or catch 79 is mounted on rod 11, and while it does not hinder the movement of rod 11 to the left, when said rod moves to the right stop 79 engages ratchet or pawl 80 and prevents the driven member 14 from coming into engagement with the driving member 15 of the clutch. When circuit 32 is closed solenoid 34 retracts pawl 80 and allows engagement of the clutch.

It will be noted that the centrifugal devices 17 and 24 and other correlated parts are preferably so proportioned as to bring brushes 28 and 29 in contact when the speeds of shafts 16 and 23 are practically equal, while if the speed of shaft 23 is greater than the speed of shaft 16, brush 29 will travel to the right farther than brush 28 (for instance as shown by the dotted lines in Figure 1) and no current will be allowed to flow in circuit 32.

Figure 3 shows another embodiment of the present invention; the reference character 100 indicates an electric motor and 101 an electric conduit connecting said motor to bar 30 of the synchronizing device; the other bar 31 is connected to another conduit 102 which includes a source of electric current 103. Conductor or conduit 102 branches in three conductors, namely 104, 107 and 132, all connected to motor 100. Branch 104 includes switch 105, which is of the open circuit kind, and switch 106 which is of the closed circuit kind. On the other hand branch 132 includes switch 125 which is of the open circuit sort, and branch 107 includes switch 108, which is of the open circuit sort, and switch 109 which is of the closed circuit sort.

It will be seen that as all branches include a switch which is normally open, no current flows in motor 100, which in normal conditions is stationary.

Accelerator pedal 99 when completely released (as shown in full lines in Figure 3) keeps switch 108 closed, but when depressed (as shown in dotted lines) leaves switch 108 free to open, and closes switch 105 by compressing spring 110 attached thereto.

Referring now also to Figure 4, it will be seen that reference character 111 indicates a clutch throw-out member or lever, pivoted around pin 112 and carrying by means of pivot 113 a catch or lever 114; the anti-clockwise rotation of said lever 114 is limited by stop 115 which is part of lever 111.

Motor 100 is provided with a bevel gear or pinion 116, which meshes with gear 117; said gear 117 and cam 133 are solid with shaft 134. Gear 117 is also provided with a lug or catch 118. Numeral 119 indicates a lever pivoted around point 120 while 121 is a spring which keeps lever 119 in the position shown in full lines in Figure 3, allowing switch 106 to stay closed. It will be seen however that as gear 117 rotates in clockwise direction, lug 118 engages lever 119 and so opens switch 106 as shown in dotted lines in Figure 3: it will also be seen that this is an extreme position and further rotation of gear 117 carries lug 118 past the range of lever 119 and said lever snaps back to its rest position, allowing switch 106 to return to the closed position.

Numeral 122 indicates a thermostatic body mounted at end 123 and terminated at the other end by a rod or plunger 124; said rod 124, when moved towards the left by an increase in temperature of thermostat 122, closes switch 125.

Reference character 126 indicates an electric circuit which includes a manually operated switch 127, a source of electric current 128, a resistance 129 and a switch 130, of the open circuit kind, having a tendency to assume the open position shown in dotted lines in Figure 3: a finger 131, provided on clutch throw-out lever 111 may keep said switch in the closed position shown in full lines in Figure 3.

Referring now more particularly to the embodiment shown in Figure 1, it will be seen that while driving with the accelerator pedal depressed for instance in the position shown in dotted lines, tension of spring 38 keeps switch 37 open. As no current flows in solenoid 42 lever 44 does not exert pressure on valve 4 and spring 5 keeps said valve rotated to the right in the closed position, as shown in dotted lines in Figure 1. However, as soon as pedal 99 is released for instance to the position shown in full lines in said figure, switch 37 closes circuit 40; current flows in solenoid 42 and attracts lever 44 which in turn rotates in clockwise direction around point 45 and forces valve 4 to rotate in anti-clockwise direction to the open position.

We shall now first consider the case that button 51 and plunger 53 be in the free-wheeling position as shown in full lines in Figure 1; this means that switch 43 is kept closed and as long as the accelerator pedal is in the released position circuit 40 is closed and valve 4 is open.

As soon as valve 4 is open vacuum is formed from manifold 2 through pipes 3 and 6 in cylinder 9 and the atmospheric pressure on the right side of piston 10 forces said piston to the left, for instance to the position shown in full lines in Figure 1. Rod 11 moves with the piston and makes lever 12 rotate from the dotted position to the full line position, disengaging clutch member 14 from the driving member 15; the transmission gears can then be shifted without touching the clutch pedal, and the car can coast or free-wheel.

Supposing that the car be allowed to free-wheel for a while, and then the driver press the accelerator pedal again while the engine is idling but the car is still running at considerable speed, the speed of rotation of the idling shaft 16 will be below the speed of shaft 23 and consequently the relative position of brushes 28 and 29 will be as shown in full lines for brush 28 and in dotted lines for brush 29. As said brushes are not in contact, circuit 32 is open and ratchet 35 prevents switch 37 from opening circuit 40; this keeps valve 4 open and the clutch disengaged.

However, as soon as the speed of the accelerating motor equals the speed of shaft 23, brushes 28 and 29 come in contact and close circuit 32; current energizes solenoid 34 which attracts ratchet 35 to the dotted position, releasing switch 37 which opens; solenoid 42 becomes inactive and allows spring 5 to close valve 4; the vacuum in cylinder 9 and port 6 is dissipated (more or less rapidly according to the adjustment of needle valve 8) by the atmospheric pressure rushing in through orifice 7, and spring 21 moves piston 10 and lever 12 to the right and engages the clutch. As the speeds of the clutch members are at this moment about equal, the engagement is very smooth.

Supposing now that button 51 and plunger 53 be in the direct drive position, as shown in dotted lines in Figure 1, it will be seen that as the accelerator pedal 99 is released current begins to flow in circuit 40 generating resistance heat in thermostatic switch 43; at normal temperature said switch keeps the position shown in full lines and completes circuit 40, but as the temperature rises it has a tendency to assume the dotted line position; it is however held down by magnet 46 until the tension generated by the heat is such as to make it snap away from the magnet past pawl 47 and assume the position shown in dotted lines. This opens circuit 40 and no more heat is generated. As the thermostatic element 43 cools off it has a tendency to come back to normal position and close the circuit again, but latch 47 prevents it from completing such movement. Only when the accelerator pedal is again depressed rod 54 makes latch 47 rotate in anti-clockwise direction against tension of spring 49 releasing switch 43, which regains the normal position and closes the circuit for a new cycle.

Magnet 46 and the parts of thermostatic switch 43 are preferably so proportioned that switch 43 does not snap open until a period of time sufficient for shifting gears has elapsed; as switch 43 snaps open, valve 4 closes and the clutch is engaged. The arrangement makes it possible to shift gears without touching the clutch pedal, and still allows the use of the motor as a brake in the same way as in cars with standard controls.

The extensions 56 and 57 on clutch pedal 55 release ratchet 35 and clutch member 14, and are provided as an emergency direct means of control.

Referring now to the embodiment illustrated in Figure 2, it will be seen that while driving with the accelerator pedal depressed (as shown in dotted lines), valve 63 is closed; but as soon as said pedal is released valve 63 opens against tension of spring 62 (as shown in full lines). Supposing now that the free wheeling control button 69 be in the position of free-wheeling shown in dotted lines in Figure 2 and corresponding to a closed valve 66, as no vacuum is formed in cylinder 72, spring 75 will keep valve 67 all the time in the open position shown in full lines. As the accelerator pedal is released the suction in the intake manifold 2 produces a vacuum in free-wheeling cylinder 9, piston 10 is forced to the left rotating lever 12 and disengaging clutch driven member 14 from driving member 15; the transmission gears can then be shifted without touching the clutch pedal, and the car can coast or free-wheel. If the car is allowed to free-wheel at high speed with the controls in the position last described, the engine speed falls down to idling speed and brushes 28 and 29 move away one from the other as already described, opening circuit 32. If the accelerator pedal is now depressed, valve 63 closes, spring 21 tends to move piston 10 towards the right and so engage the clutch, but stop 79 engages ratchet 80 and the completion of the stroke is prevented. However, as soon as the speed of the accelerating motor equals the speed of the transmission shaft 23, brushes 28 and 29 come in contact and close circuit 32: current energizes solenoid 34 which attracts ratchet 80 to the dotted line position releasing stop 79 and allowing spring 21 to engage the clutch; as the speeds of the two clutch members are about equal, the engagement is very smooth.

Supposing now that button 69 be in the direct drive position and valve 66 be open, as shown in full line in Figure 2, as the accelerator pedal is released vacuum is formed in cylinder 9 and the clutch is released. At the same time vacuum is also formed in cylinder 72 but at a slower rate according to the aperture of orifice 71 controlled by needle 73. Said needle is preferably so adjusted that sufficient time for shifting gears will elapse before enough vacuum is formed in cylinder 72 to pull piston 74 to a position corresponding to a closed valve 67, as shown in dotted lines in Figure 2. Then valve 67 closes and as atmospheric pressure is restored on both sides of piston 10 (for instance through leaks) the clutch is again engaged. It will be noted that ratchet 80 does not prevent the clutch engagement in this case, as it is kept in the release position by lever 78, which is rotated by disc 77 to the dotted position.

When the accelerator pedal is again depressed and valve 63 closes, vacuum is dissipated in cylinder 72, piston 74 is returned by spring 75 to the position shown in full line, and valve 67 is opened, ready for another cycle.

Referring now to the embodiment shown in Figures 3 and 4, we shall first see how it operates when the manually controlled switch 127 is left open. In normal driving pedal 99 is in the depressed position as shown in dotted lines, switch 105 is closed and switch 108 is open; lug 118 is in the position shown in dotted lines and so are lever 119 and switch 106, which is open: cam 133 and levers 111 and 114 also are in the positions shown in dotted lines, the clutch being engaged and switch 109 closed. No current energizes motor 100 which is stationary.

If now the driver releases the accelerator pedal 99, switch 105 opens while switch 108 closes completing the circuit of conductors 107 and 102 connecting the electric source 103 and motor 100; said motor begins to rotate and through pinion 116 moves gear 117 and cam 133, which engages finger 114 and compels lever 111 to rotate in anti-clockwise direction until the clutch is released (position shown in full lines). At this time finger 114 opens switch 109 and so motor 100 stops; levers 111 and 119 and cam 118 also stop in the position shown in full lines in Figure 3. As the clutch is released the vehicle may coast or free-wheel, and the gears may be shifted.

As the driver again depresses pedal 99, switch 108 opens while switch 105 closes, and if the speed of the engine corresponds to that of the vehicle so that brushes 28 and 29 are in contact, a closed circuit is formed by conductors 101, 102 and 104; if the engine speed is lower than the speed of shaft 23 the circuit is not completed, as already explained, until the engine is accelerated to the speed of shaft 23. As soon as the circuit is completed, motor 100, gear 117 and cam 133 begin to rotate and soon the step of cam 133 passes beyond finger 114 allowing said finger and lever 111 to drop to the left to the position shown in dotted lines in Figure 3, and the clutch to be engaged; this also retracts finger 131 from switch 130 and allows said switch to open. As gear 117 continues to rotate, lug 118 engages lever 119 and opens switch 106, breaking the circuit; levers 111 and 119 and cam 118 stop in the position shown in dotted lines, the clutch being engaged until the accelerator pedal is again released and another cycle begun.

Supposing now that the operator leave switch 127 closed and then release pedal 99, motor 100 and connected parts will be set in movement until lever 111 assumes the position shown in full lines in Figure 3, as already explained. In such position finger 131 closes switch 130 and completes circuit 126 which in the preceding case was kept open by switch 127. As current flows in resistance 129, the heat generated is transmitted to thermostat 122 which expands and through rod 124 closes switch 125 and completes circuit 102, 132, 104, and starts motor 100.

As already seen, as gear 117 and cam 133 rotate, the cam step passes beyond finger 114 and lever 111 rotates in clockwise direction allowing the clutch to be engaged; about at the same time lug 118 engages lever 119 and opens switch 106 with the result that motor 100 stops. If the accelerator pedal is again depressed the cycle just described is repeated.

It will be noted that after pedal 99 is released the clutch does not stay in the released position longer than the time necessary for coil 129 and thermostat 122 to reach the temperature at which thermostat 122 closes switch 125; said temperature and said length of time depend on the proportions of the parts involved and are preferably so chosen that gears may be shifted while the clutch is released, without operating the clutch pedal.

What I claim as my invention is:

1. In a motor-car including an engine and a clutch, means controlling the engine power, means controlling the clutch, means actuating said clutch controlling means in dependence upon the position of said engine controlling means, and temperature controlled means rendering said actuating means inoperative.

2. In a motor-car including an engine and a clutch, means controlling the engine power, means connected to said engine controlling means and disengaging the clutch when said engine controlling means are brought to the idling position, means for thereafter engaging the clutch, and temperature controlled means for rendering said engaging means operative.

3. In a motor-car including an engine, a change-speed transmission and a clutch, means controlling the engine power, means controlling the clutch, means actuating said clutch controlling means in dependence upon the position of said engine controlling means, and temperature controlled means for in part controlling the operation of the actuating means to effect the desired operation of the clutch.

MICHELE CASERTA.